United States Patent Office 3,215,548
Patented Nov. 2, 1965

3,215,548
ADDITIVES FOR CONCRETE, MORTAR AND GROUT
Charles A. Vollick, Westwood, N.J., assignor to Sika Chemical Corporation, Passaic, N.J., a corporation of New Jersey
No Drawing. Filed Dec. 14, 1961, Ser. No. 159,466
7 Claims. (Cl. 106—90)

This invention relates to improvements in aqueous hydraulic cement mixtures such as concrete, mortor and grout and, more particularly, to improved method and means for inhibiting or reducing "bleeding" of such mixtures during setting or hardening.

The term "hydraulic cement," as used herein, is intended to include any cement which has the characteristic of hardening under water, e.g., Portland cement, blends of Portland cement and natural cement, air-entraining Portland cement, Portland-pozzolan cement, slag cement, or mixture of Portland cement and blast-furnace cement, and like materials.

The term "concrete" is used to designate a mixture of hydraulic cement, aggregate and water, which sets to form a hardened mass. Concrete may contain either mineral or nonmineral aggregate, including naturally occurring materials, for instance, sand and gravel or quarried rock, or manufactured aggregate, such as expanded shale, clay or the like.

The term "mortar" is used herein to designate a mixture of hydraulic cement, fine aggregate and water, and the term "grout" designates a mixture of hydraulic cement and water, and sometimes fine sand. Grout's normally have higher fluidity than mortars and can be pumped through pipe lines and forced into small spaces, for instance into voids or cracks or porous concrete, or into spaces between preplaced aggregate.

It has previously been suggested to include in such cement mixtures various compounds for increasing strength or for retarding setting or hardening or for permitting the use of less water without reducing workability or fluidity of the mixture. Such additives are usually individually designated "admixtures."

For instance, lignosulphonic acids or the salts of lignosulphonic acids, collectively referred to as "lignins," or hydroxylated carboxylic acids or the salts of hydroxylated carboxylic acids, have previously been proposed as admixtures for retarding setting or for reducing the amount of water required to produce cement mixtures at a given workability or placeability. Likewise, certain reaction products of sulphonated naphthalene, or of the salts of sulphonated naphthalene, have been proposed as admixtures for permitting a reduction in the amount of water used without reducing plasticity of the cement mixture and thus increasing the strength of the hardened concrete.

Even though the required amount of water can be substantially reduced through the use of such admixtures, the quantity of water required to produce a cement mixture of suitable workability and placeability is always in excess of the quantity of water required to hydrate the cement, so that excess water is invariably present in the mixture is used.

Excess water present in concrete, or other cement mixtures, may be brought ot the surface when the mixture is manipulated or worked in a plastic state, a condition known as "bleeding." Also, water migration, or bleeding, through the plastic concrete sometimes leaves channels which are planes of weakness in the concrete when it hardens.

A further, particularly objectionable condition resulting from bleeding is when excess water is carried to the edges of formed concrete during consolidation and vibration, forming water pockets against the sides of the form work. Such water pockets will appear as holes and imperfections in the hardened concrete after the form work is removed.

Admixtures composed of salts of hydroxylated carboxylic acid have a tendency ot increase bleeding. The salts of lignosulphonic acid tend to reduce bleeding, somewhat, through the entrainment of small quantities of air in the concrete.

I have discovered that a most surprising reduction in bleeding of hydraulic cement mixtures, of the types described, is effected by including in the mixture both in admixture consisting essentially of the lignins or of the hydroxylated carboxylic acids or salts thereof, and an admixture consisting essentially of a sulphonated naphthalene or the salt of a sulphonated naphthalene.

While I am not presently able to explain this unexpected phenomenon, it appears to be due to some synergistic action between the two admixtures which retards or inhibits bleeding of the mixture.

I have found, for instance, that water retention in the hydraulic cement mixture can be increased by approximately 10% by the inclusion of a sulphonated naphthalene admixture and that it may be increased by approximately 17% by the inclusion of a lignin admixture. However, by the concurrent use of a lignin admixture and a sulphonated naphthalene admixture, the water retention may be increased by in excess of 75%.

The optimum proportions of the respective admixtures used, in accordance with my present invention, are subject to considerable variation, which is dependent, in large measure, upon the composition of the particular hydraulic cement mixture, for instance the particular hydraulic cement and aggregate used, the proportions thereof, whether a concrete, a mortor or a grout, and the proportion of water used in the mixture.

I have found, however, that in most instances effective results, with respect to the inhibiting of bleeding, are obtained where the proportion of the lignin, or hydroxylated carboxylic acid admixture, relative to the proportion of the sulphonated naphthalene constituent, is within the range from about 1:0.005 to about 1:1. Especially advantageous results are generally obtained where the relative proportions of the above-named admixtures are within a range from about 1:0.5 to about 1:1.

The proportions of the respective additives included in the cement mixtures are more conveniently expressed in terms of weight of the additives relative to the weight of the cement used in the mixture. On this basis, the optimum proportion of the lignin or hydroxylated carboxylic acid admixture will usually fall within the range from about ¼ pound to about 1 pound per sack of cement, i.e., approximately 100 pounds of cement, and the optimum proportion of the sulphonated naphthalene admixture will usually fall within the range from about 0.005 pound to about 1 pound per sack of cement. Somewhat larger proportions of these admixtures may be used without deleterious results, but economy usually dictates the use of no more admixture than required.

3

Though the primary advantage of the present invention is the inhibiting of bleeding, the invention also has the advantage of increasing the compressive strength of the hardened cement mixture and permitting the use of less water to produce a cement mixture of a given workability.

The invention and the advantages thereof will be illustrated by the following specific examples. It will be understood, however, that the examples are for illustrative purposes and are not limitative as to the scope of the invention.

*Example I*

In accordance with the principle of post-tensioning, steel beams must be grouted, after stress is applied to the steel. Ordinarily, grout is pumped around the steel to fill cavities between the steel and the form or between the steel and a hardened concrete. It has been observed that cracks have developed in some "post-tensioned" members either before or after they have been placed in service. One apparent reason for this is that, due to bleeding, water is entrapped along the steel which, on freezing, may cause disruptive expansion.

In order to observe the flow characteristics of grouts, plastic tubes were bent to simulate ducts in a post-tensioned member. Steel wires were strung through the tubes and a hand pump was used to force grout through the tubes. During the grouting operation, it was observed that water had a tendency to separate and rise to the top of the tubes. Using ordinary grout, water pockets were formed at the extreme ends of the tubes which completely exposed the steel cable. But where the grout contained 0.5% to 1%, by weight of the cement, of equal parts, by weight, of lignin and sulphonated naphthalene, in accordance with my invention, this water separation was minimized and exposed steel did not result.

The Engineer Corps of the United States Army has developed a method for determining the water retentivity of grout mixtures (CRD–C–80–58). In accordance with that method, grout is introduced into the top of a filtering funnel, a vacuum of 28 inches of mercury is maintained during filtering, and the length of time required to extract 75 milliliters of water is carefully measured.

*Example II*

Further to illustrate the effectiveness of the present invention, 3 grouts, each containing 1 part flyash and 2 parts hydraulic cement and sufficient water to produce a flow of 15 seconds, were mixed for 3 minutes and tested for water retentivity by the above-identified method. The first of these grouts contained no admixture. The second grout contained 1%, based on the weight of the cement, of an admixture consisting essentially of sodium lignosulphonate. In the third grout, there was incorporated ½% of the admixture used in the second grout and ¼% of a sulphonated naphthalene compound.

The effect of the combined actions of the two admixtures, used in accordance with my invention, is illustrated by the following tabulation in which the grouts, in the order named, are identified by the letters A, B and C, respectively:

| Grout | A | B | C |
|---|---|---|---|
| Cement, lbs | 1,650 | 1,650 | 1,650 |
| Flyash, lbs | 824 | 824 | 824 |
| Water, lbs | 1,068 | 1,044 | 998 |
| Water reduction, percent | | 2.3 | 6.6 |
| Flow, secs | 15 | 15 | 15 |
| Seconds to extract 75 ml. of water | 87.4 | 122 | 129 |

*Example III*

As I have previously noted, the combined use of the two additives, in accordance with my present invention, not only inhibits bleeding but also markedly increases the compressive strength of the hardened cement mixture. To illustrate this point, I have prepared two mixtures, each containing 1 part flyash, 2 parts hydraulic cement and 3 parts sand, by weight, with sufficient water to produce a flow of 25 seconds. To the first mixture, no admixture was added. In the second, I incorporated 1% of an admixture composed of equal parts of lignin and of sulphonated naphthalene, together with a small amount of aluminum powder, as an expanding agent.

The respective grouts and ¾ inch stone were alternately poured into a 6 by 12 inch cylinder mold in three lifts and rodded after each lift. Test results of the respective grouts, including water retentivity and compressive strength of the resultant hardened concretes, are set forth in the following tabulation:

| | Plain | With Admixture |
|---|---|---|
| Lbs. of water per lb. cement-flyash | 0.47 | 0.43 |
| Water reduction, percent | | 7.1 |
| Expansion, percent | | 8.0 |
| Seconds to extract 75 ml. of water | 210 | 540 |
| Compressive strength of 6" by 12" cylinder, p.s.i. at end of— | | |
| 7 days | 1,110 | 1,760 |
| 28 days | 1,790 | 2,620 |

*Example IV*

Two mortar mixtures, each containing 1 part type I Portland cement and 3 parts Ottawa sand, by weight, and sufficient water to produce a flow on the standard flow table of 95 to 100%, were prepared. In one mixture, no admixture was incorporated. In the second mixture, there was incorporated ½%, by weight of the cement, of an admixture consisting of equal parts of lignin and sulphonated naphthalene, and a small amount of an aluminum powder as an expanding agent.

The respective mortars were placed in metal molds and "struck-off" level with the top of the mold. After the mortars had hardened, the mortar containing the admixture remained level with the top of the mold. But the level of the plain mortar containing no admixture, i.e., the plain mortar, was found to be below the top of the mold, indicating that bleeding and shrinkage had occurred. Further data concerning these mortars and the compressive strength of 2-inch cubes of the respective mortars after 7 days are set forth in the following tabulation:

| | Plain | With Admixture |
|---|---|---|
| Lbs. of water per lb. cement | 0.54 | 0.50 |
| Water reduction, percent | | 7.7 |
| Compressive strength of 2" x 2" cubes at 7 days, p.s.i | 2,580 | 2,740 |

From the foregoing example, it appears that my combined admixtures increase not only the flow characteristics of the mortars or grouts, but also its water retentivity. The increased water retentivity obtained by the combined use of the lignin admixture and the sulphonated naphthalene admixture has usually been found to be several times as great as the water retentivity obtained through the use of either of the individual admixtures.

*Example V*

Four grout mixture were prepared, each from 1000 gram of hydraulic cement, 500 grams of flyash, 1500 gram of and 750 milliliter of water. No admixture was incorporated in the first grout. In the second mixture, there was incorporated a sulphonated naphtalene in a proportion equivalent to ¼ pound per sack of cement. In the third mixture, there was incorporated a lignin admixture in a proportion equivalent to ¼ pound lignin per sack of cement. In the fourth mixture, there was incorporated lignin and sulphonated naphthalene each in proportions equivalent to ¼ pound per sack of cement.

The number of seconds required for the respective mixture to flow through a standard flow cone and the water retentivity of each mixture, each determined by conventional methods, are set forth in the following tabulation:

| Admixture | Seconds Through Flow Cone | Increase in Water Retention Over Control, Percent |
|---|---|---|
| Control (none) | 16 | |
| ¼ lb. sulphonated naphthalene per sack of cement | 15 | 10.5 |
| ¼ lb. lignin per sack of cement | 14 | 17.3 |
| ¼ lb. lignin plus ¼ lb. sulphonated naphthalene per sack of cement | 13 | 76.7 |

From the foregoing tabulation, it is readily apparent that the increase in water retentivity brought about from the use of the combined admixtures in accordance with the present invention is far in excess of what could be expected from the combined use of these two additives, indicating definite synergistic action.

While the foregoing examples have been directed primarily to mortars and grouts, the invention is equally applicable to concretes, as illustrated by the following example:

Example VI

Three concrete mixtures were made using type I cement, aggregate graded from No. 4 to ¾ inch, and sand. The first concrete was for control purposes and contained no admixture. The second concrete contained sodium lignosulphonate in a proportion equivalent to ¼ pound per sack of Portland cement. The third concrete contained a like amount of sodium lignosulphonate plus 0.005 pound of sulphonated naphthalene per sack of Portland cement. In each case, water was added in an amount to produce similar workability as indicated by the conventional slump tests.

The respective concretes were molded into 6 inch by 12 inch cylinders and fog-cured at 73° F. Two cylinders produced from each of the mixtures were tested for compressive strength after being aged 3 days, 7 days and 28 days, respectively.

The third concrete mixture, prepared in accordance with the present invention, was found to exhibit a materially lower bleeding than that exhibited by either of the other two concrete mixtures and required less water than the control mixture.

Data concerning these tests are set forth in the following tabulation, the respective cements, in the order named being identified as A, B and C:

| | A | B | C |
|---|---|---|---|
| Cement content, sacks per cu. yd. | 4.0 | 4.0 | 4.0 |
| Slump, inches | 5.25 | 6.0 | 5.0 |
| Water reduction, percent | | 6.1 | 5.4 |
| Compressive strength, lbs. per sq. in.: | | | |
| 3 days | 880 | 1,250 | 1,335 |
| 7 days | 1,200 | 1,615 | 1,885 |
| 28 days | 2,210 | 2,705 | 2,940 |

The method by which the admixtures are incorporated in the cement mixtures does not appear to be of primary importance. The admixtures may, with advantage, be incorporated in the hydraulic cement during, or at the place of manufacture, or otherwise prior to use, or the admixture may be added, either separately or as a prepared mixture of the two admixtures, at the time of mixing the cement with the water. In such prepared mixtures of the two admixtures, it is desirable that the two be present in about equal proportions.

I have found the sodium salts and the calcium salts of sulphonated naphthalene to be highly effective, when used in accordance with my present invention, for increasing water retentivity in mortars and grouts. Sulphonated naphthalene compounds containing hydroxyl or amino groups have also been found to be highly effective, and their use in accordance with my present invention has the further advantage of increasing workability and the flow characteristics of mortars and grouts.

I claim:

1. Method for inhibiting bleeding of aqueous hydraulic cement mixtures selected from the group consisting of Portland cement, blends of Portland cement and natural cement, air-entraining Portland cement, Portland-pozzolan cement, slag cement, and a mixture of Portland cement and blast-furnace cement which comprises incorporating in the cement mixture a small percentage, within the range from about 0.25% to about 1% of (1) an admixture consisting essentially of a compound of the group consisting of the lignins, and a small percentage, within the range from about 0.005% to about 1% of (2) an admixture consisting essentially of a compound of the group consisting of sulphonated naphthalene and the salts of sulphonated naphthalene, each based on the weight of the cement.

2. The method of claim 1 further characterized in that the admixtures are preliminarily dispersed in the hydraulic cement.

3. The method of claim 1 further characterized in that the admixtures are incorporated in the aqueous hydraulic cement mixture at the point of mixing the hydraulic cement with water.

4. An admixture for inhibiting the bleeding of aqueous hydraulic cement mixtures selected from the group consisting of Portland cement, blends of Portland cement and natural cement, air-entraining Portland cement, Portland-pozzolan cement, slag cement, and a mixture of Portland cement and blast-furnace cement consisting essentially of (1) a compound of the group consisting of the lignins, and (2) a compound of the group consisting of sulphonated naphthalene and the salts of sulphonated naphthalene, the weight ratio of the constituent of group (1) to that of group (2) being within the range from about 1:0.5 to about 1:1.

5. The composition of claim 4 in which the two constituents are present in substantially equal proportions.

6. A cement composition consisting predominately of an hydraulic cement selected from the group consisting of Portland cement, blends of Portland cement and natural cement, air-entraining Portland cement, Portland-pozzolan cement, slag cement, and a mixture of Portland cement and blast-furnace cement, and containing a small percentage within the range from about 0.25% to about 1% of (1) a compound of the group consisting of the lignins, and a small proportion, within the range from about 0.005% to about 1% of (2) a compound of the group consisting of sulphonated naphthalene and the salts of sulphonated naphthalene, each based on the weight of the cement.

7. The composition of claim 6 in which the weight ratio of the compound from group (1) to the compound from group (2) is within the range from about 1:0.5 to 1:1.

References Cited by the Examiner

UNITED STATES PATENTS

| | | | |
|---|---|---|---|
| 1,863,990 | 6/32 | Nelson | 106—90 |
| 2,141,569 | 12/38 | Tucker | 106—90 |
| 2,174,051 | 9/39 | Winkler | 106—90 |
| 2,360,519 | 10/44 | Scripture | 106—90 |
| 2,366,737 | 1/45 | Loder et al. | 106—90 |
| 2,512,067 | 6/50 | Linford | 106—90 |
| 2,582,459 | 1/52 | Salathiel | 106—90 |
| 2,690,975 | 10/54 | Scripture | 106—90 |
| 2,757,096 | 7/56 | Tiersten | 106—90 |
| 2,927,033 | 3/60 | Benedict et al. | 106—90 |

TOBIAS E. LEVOW, *Primary Examiner.*

JOSEPH REBOLD, *Examiner.*

UNITED STATES PATENT OFFICE
CERTIFICATE OF CORRECTION

Patent No. 3,215,548 November 2, 1965

Charles A. Vollick

It is hereby certified that error appears in the above numbered patent requiring correction and that the said Letters Patent should read as corrected below.

Column 1, line 10, for "mortor" read -- mortar --; line 62, for "is" read -- as --; same column 1, line 64, and column 2, line 12, for "ot", each occurrence, read -- to --; line 41, for "mortor" read -- mortar --; column 4, line 63, for "mixture" read -- mixtures --; line 64, for "gram" read -- grams --; line 65, for "gram of" read -- grams of sand --; line 67, for "naphtalene" read -- naphthalene --.

Signed and sealed this 19th day of July 1966.

(SEAL)
Attest:

ERNEST W. SWIDER
Attesting Officer

EDWARD J. BRENNER
Commissioner of Patents